Figures 1, 2:
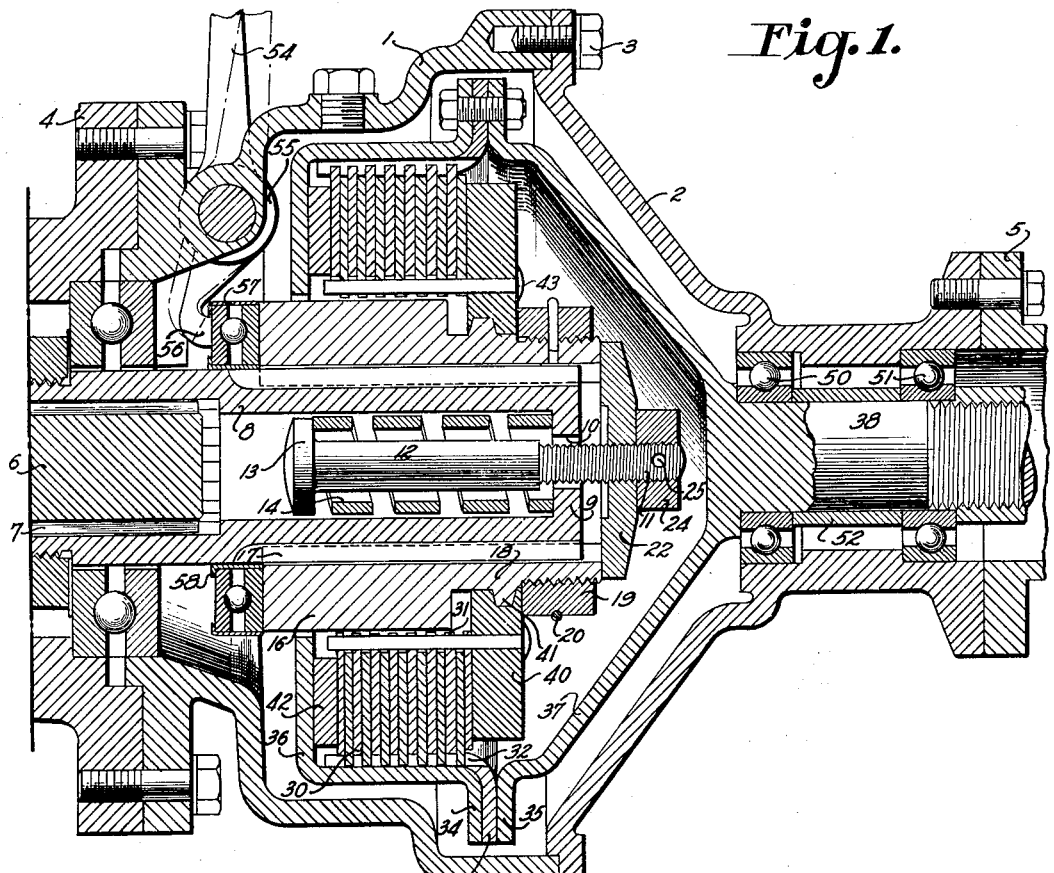

Nov. 28, 1933.   R. P. LANSING   1,937,233
DRIVING MECHANISM
Filed April 28, 1931

Inventor
Raymond P. Lansing
F. B. Smith
Attorney

Patented Nov. 28, 1933

1,937,233

UNITED STATES PATENT OFFICE 1,937,233

DRIVING MECHANISM

Raymond P. Lansing, Montclair, N. J.

Application April 28, 1931. Serial No. 533,563

16 Claims. (Cl. 192—48)

This invention relates to driving mechanism, and particularly to mechanism of the type in which the driven member under certain circumstances becomes the driving member, and under other conditions runs faster than (or overruns) the driving member.

An object of the invention is to provide a mechanism of the foregoing character which, although capable or adaptable to other uses, is particularly well suited for use in motor vehicles.

In the operation of motor vehicles it is desirable to provide means whereby traction members of the vehicle, after obtaining a certain speed may be drivably disconnected from the power shaft of the vehicle so that the traction members may rotate faster than the then existing gear ratio between the power shaft and said members will permit. Such disconnecting means are commonly referred to as free-wheeling or free-wheel devices, to which general class the present invention relates.

Another object of the invention is to provide a free-wheel device of the foregoing character involving the use of a friction clutch mechanism of novel construction constituting a driving connection under certain conditions and being automatically releasable to permit free-wheeling under other conditions.

Another object of the invention is to provide in a friction clutch mechanism of the foregoing character, novel means for enabling said mechanism to transmit a predetermined torque, in conjunction with means for decreasing or virtually eliminating the torque transmitting capacity of said clutch mechanism whenever free-wheeling operation is desired.

A further object of the invention is to provide in novel clutch mechanism of the foregoing character, a manually shiftable device capable of locking the mechanism against free-wheeling operation.

A further object of the invention is to provide in a free-wheeling device embodying friction clutch mechanism of the character just described, novel means operative upon such mechanism to maintain therein an initial relatively light frictional pressure serving to make it possible to immediately establish driving connection between the engine and the traction members when such driving connection is desired, irrespective of the speed of the engine.

Another object of the invention is to provide a free-wheeling clutch mechanism which is so constructed and disposed that when used in a vehicle, it may serve not only as a free-wheeling clutch but may also take the place of, and function as a main clutch mechanism, with or without free-wheeling characteristics, at the option of the operator.

A further object of the invention is to provide a device of the foregoing character possessing practical merit because of its simplicity of construction, flexibility of operation, ease of installation and accessibility.

These and other objects and advantages to be derived from the use of the invention herein disclosed will become evident from a study of the following description, when read with reference to the accompanying drawing illustrating one embodiment of the invention.

In the drawing:

Fig. 1 is a central longitudinal sectional view of a device embodying the invention and showing the parts in the position occupied during free-wheeling; and Fig. 2 is a sectional view of the device shown in Fig. 1 illustrating the elements in the position occupied during power drive, and either with or without the free-wheeling feature.

In the form shown, the structure of the invention embodies a casing having two sections, 1 and 2, fastened together by suitable means 3 to constitute a housing attached at one end to a flanged connecting housing 4 and at the opposite end to a flanged tubular member 5. Extending into the casing at the forward end is a member 6 which represents the power shaft of a motor vehicle or other mechanism, said shaft constituting the driving member of the assembly. Shaft 6 is preferably provided with splines 7 adapted to engage corresponding splines on the inner surface of a sleeve or hollow shaft 8 extending centrally through the mechanism and provided at its outer end with an inwardly turned flange 9 having a central aperture 10 permitting free passage therethrough of the threaded end 11 of a bolt 12, against the head 13 of which presses a coiled spring 14, the function of which will appear more fully hereinafter. The opposite end of the spring 14 rests on the seat constituted by the portion 9 of the hollow shaft 8.

A second hollow shaft or sleeve 16 surrounds the shaft 8 and is drivably connected thereto by suitable means such as the splines indicated at 17, the outer portion 18 of the sleeve 16 being threaded to receive a similarly threaded collar or nut 19 which is preferably locked in position by suitable means such as member 20, the end plate 22 being threadedly secured to the bolt 12 and normally disposed adjacent the end of shaft 16, to which position it is normally urged by the spring 14, the tension on the latter being adjustable by the provision of a suitable adjusting nut 24 held in adjusted position on bolt 12 by suitable means as a cotter pin 25.

The novel yielding clutch mechanism for drivably connecting threaded sleeve 16 with the driven member preferably comprises an assembly of annular discs 30, the individual discs of which are splined alternately to the inner circumferential surface of the drum or barrel member 32, the latter having an outwardly turned flange 33 adapted to be secured in place between the flanges 34 and 35 provided on sections 36 and 37, respectively, which together constitute an inner housing rotatable with a driven member 38 relatively to the outer housing formed by casings 1 and 2.

The annular clutch plates 30 are adapted to be moved into frictional driving engagement, whereby torque is transmitted from member 16 to member 38, by novel means which preferably take the form of an internally threaded annular plate or nut 40, adapted to engage a corresponding thread 41 of suitable pitch and root width. A thrust ring 42 is preferably interposed between the innermost disc 30 and the end surface of the casing 36, while a plurality of angularly spaced pins 43 preferably extend through the member 40 and the inner edges of alternate clutch discs 30 to constitute a driving connection between said alternate discs and the member 40.

From the foregoing it will be apparent that the spring 14 is effective to maintain a predetermined and substantially constant degree of axial pressure upon the discs of the clutch assembly 30, and therefore acts to drivably connect the power shaft 6 with the driven shaft 38 through the intermediary of shafts 8 and 16, nut 40, discs 30, barrel 32, and casing 37, the latter preferably being integral with the shaft 38, as shown, and rotatable, in ball bearings 50 and 51 relative to casing 2. Such driving means are operative to maintain a yielding driving connection of predetermined torque capacity between the members 6 and 38, until operation of the releasing or free-wheeling means, now to be described.

The means for relieving the frictional pressure between the adjacent discs of the clutch assembly 30 and thereby permitting substantially free rotation of the shaft 38 relatively to the shaft 6 preferably comprises a manually or otherwise arbitrarily operable lever 54, having an apertured portion 55 intermediate its ends adapted to be pivotally received on a pin extending from the wall of casing section 1, and having a lower hooked end 56 adapted to contact with a bearing 57 secured in position by suitable retaining means 58 adjacent the end of the outer shaft or sleeve 16.

With this construction, it will be seen that with the lever 54 locked (by suitable means, not shown) in the position illustrated in full lines in Figs. 1 and 2, and with shaft 38 overrunning shaft 6, the finger 56 will be effective to absorb the stress of spring 14, as it is transmitted through the shaft 16; and hence member 40 transmits no appreciable axial pressure on the discs 30. Consequently there is practically unrestrained rotation—except for the normal friction between adjacent discs—of the drum 32 and shaft 38 relatively to the shaft 16 (and hence the shaft 6). Under these conditions, the traction members or other means driven from the shaft 38, are free to run at any speed in excess of the speed of rotation of the shaft 6.

As soon, however, as the speed of the shaft 38 falls below that of the power shaft 6, or, as soon as the power shaft 6 is accelerated to a speed beyond that of the traction shaft 38, the splined connection between the shaft 6 and shaft or sleeve 16 operates to cause a jackscrew action between the thread 41 of the latter shaft, and the corresponding thread of the member 40, which jackscrew action moves member 16 to the right away from finger 56, and thereby moves discs 30 into friction engagement with a pressure sufficient to transmit the required torque from shaft 16 through the member 40, discs 30, drum 32 and casing 37 to the shaft 38. Clutch 30 has sufficient torque capacity (due to its absorption of the entire stress of spring 14) to take care of the maximum torque requirements of the prime mover; yet this torque capacity may be varied, if desired, by the setting of nut 24 to protect the parts against jamming action and to take care of normal wear.

The positive driving relation just described continues until the speed of the shaft 38 again exceeds that of the shafts 6, 8 and 16, whereupon the reverse screw action takes place between the members 40 and 41 to permit a return of the shaft 16 to transfer the stress of the spring 14 to the finger 56 (assuming the latter is still in the "free-wheeling" position shown in full lines in Figs. 1 and 2).

If it be desired to temporarily lock the mechanism against free-wheeling operation, as for example when a vehicle fitted with the invention is on a hazardous down grade, the lever 54 is shifted sufficiently to move the finger 56 to the dash-line position indicated in the drawing, in which position it is clear of the thrust-bearing 57, and therefore the transfer of stress to said lever is prevented whether the shaft 16 is in the position shown in Fig. 1 or in the position shown in Fig. 2. It will be seen therefore, that with lever 54 in the dash-line position, a positive frictional driving connection is maintained between the shafts 6 and 38, and in the event that the latter shaft is overrunning the former, the engine (if the mechanism is used in combination therewith) will act as a brake or retarding agent with respect to the traction members of the vehicle; and when the speed of the shaft 6 exceeds or equals that of the shaft 38, the vehicle will be propelled by the transmission of torque through the automatic clutch mechanism. Thus it is apparent that lever 54 constitutes a control member by operation of which the vehicle may be controlled exclusively of any other clutch mechanism. Hence there is no need to provide the vehicle with any clutch other than the one herein described.

When the novel mechanism herein disclosed is applied to, or made a part of, a motor vehicle power plant, it may be installed in any desired location relative to the engine, as for example, adjacent the transmission or gear shift casing; and, as above suggested, may act as a combination main clutch and free-wheel device. It is to be understood, however, that the invention is applicable to other uses wherein it is desirable to drivably connect driving and driven members in such manner as to permit either to act as the drive, or under other conditions to permit the members to rotate independently.

While the embodiment of the invention herein disclosed and described in detail is of considerable practical merit, it is contemplated that changes may be made in the construction and relative arrangement of the parts. Thus, for example, the relative location of the parts may be varied, and the shaft 38 may be made the driving member with the shaft 6 the driven member. Likewise a plurality of compression springs located in spaced angular relation about the shaft 16, may be substituted for the single present compression spring shown at 14.

It is to be understood that various other changes may be made in the form, details of construction, arrangement of parts and the uses to which they are applied, without departing from the invention as defined in the appended claims.

What is claimed is:

1. In combination, a driving shaft, a driven shaft, a screw shaft driven by the driving shaft and adapted for longitudinal movement relative thereto, resilient means tending to hold said screw shaft in a predetermined position longitudinally of the driving shaft, an abutment for resisting the action of said resilient means on the screw shaft, a plurality of interleaving friction discs operatively connected to said screw shaft and to said driven shaft, and a nut threaded on the screw shaft and engaging said discs, torque applied to the driving shaft being effective to move said screw shaft out of engagement with said abutment whereby the thrust of the resilient means is effective through said nut to hold said discs in close frictional engagement.

2. In a device of the class described, a driving member, a driven member, a friction clutch mechanism drivably connecting said members, resilient means for holding said friction clutch mechanism in torque transmitting position, means for transferring the stress produced by said resilient means to decrease the torque capacity of said clutch mechanism in response to a predetermined change in the relative rotative speeds of said driving and driven members, and separate manually controlled means for rendering said torque capacity decreasing means ineffective, said last named means comprising a member positioned so as to absorb the stress of said resilient means during the period of maintenance of said relative rotative speeds, and manually controlled means for shifting said member.

3. In a device of the class described, a driving member, a driven member, a friction clutch mechanism drivably connecting said members, resilient means for constantly urging said friction clutch mechanism into predetermined torque transmitting position, means for transferring the stress produced by said resilient means to decrease the torque capacity of said clutch mechanism whenever the driven member overruns the driving member, separate manually controlled means for rendering said torque capacity decreasing means ineffective, said last named means comprising a member operative to absorb the stress of said resilient means only when said driven member overruns said driving member, and manually operable means for shifting said member out of such normal position.

4. In a device of the class described, a driving shaft, a driven shaft, a manually shiftable member, a friction clutch mechanism interposed in a position to drivably connect said shafts, a spring abutting said driving shaft and constantly stressed to exert an axial pressure upon either said manually shiftable member or said clutch mechanism, and means dependent upon the relative rotative speeds of said shafts for determining which of said members shall absorb such stress.

5. In a device of the class described, a driving shaft, a driven shaft, an abutment, a friction clutch mechanism interposed in a position to drivably connect said shafts, a spring abutting said driving shaft and constantly stressed to exert an axial pressure upon either said abutment or said clutch mechanism, and means dependent upon the relative rotative speeds of said shafts for determining which of said members shall absorb such stress.

6. In a device of the class described, a driving member, a driven member, a friction clutch mechanism drivably connecting said members, resilient means for urging said friction clutch mechanism into predetermined torque transmitting position, means for transferring the stress produced by said resilient means to decrease the torque capacity of said clutch mechanism in response to a predetermined change in the relative rotative speeds of said driving and driven members, separate manually controlled means for rendering said torque capacity decreasing means ineffective, said last named means comprising a member operative to absorb the stress of said resilient means only during the period of maintenance of said relative rotative speeds, and means movable axially toward or away from said stress absorbing member in response to relative rotation between said driving and driven members.

7. In a device of the class described, a driving member, a driven member, a friction clutch mechanism drivably connecting said members, resilient means for urging said friction clutch mechanism into predetermined torque transmitting position, means for transferring the stress produced by said resilient means to decrease the torque capacity of said clutch mechanism in response to a predetermined change in the relative rotative speeds of said driving and driven members, separate manually controlled means for rendering said torque capacity decreasing means ineffective, said last named means comprising a member operative to absorb the stress of said resilient means only during the period of maintenance of said relative rotative speeds, and a helical element movable axially toward or away from said stress absorbing member in response to relative rotation between said driving and driven members.

8. In a motor vehicle transmission system, combined clutch and free-wheeling mechanism comprising a driven clutch member, a driving shaft, a screw drivably connected to said driving shaft, a nut having threaded engagement with said screw, a plurality of discs having permanent frictional engagement with one another and alternately connected for rotation with said driven clutch member and said nut to thereby transmit driving torque from the nut to said clutch member, means for automatically varying the torque transmitting capacity of said discs in response to relative longitudinal movement between said nut and screw, and means distinct from said last named means for limiting the extent of such relative longitudinal movement.

9. In combination, a driving member having a longitudinally movable sleeve thereon, a nut threaded on said sleeve for rotary and longitudinal movement thereon, yielding means tending to move said sleeve in one direction along the driving member, an adjustable abutment for opposing the tendency of the yielding means, a driven member, and a plurality of friction discs alternately, drivably connected to said nut and driven member.

10. In a motor vehicle transmission system, combined clutch and free-wheeling mechanism comprising driving and driven members, a friction clutch operatively positioned intermediate said members, free-wheeling means comprising a manually operable member shiftable to render said friction clutch ineffective when said driven member overruns the driving member, and resilient means operative to maintain said friction clutch under a constant perdetermined engaging pressure regardless of either the absolute or relative speeds of said driving and driven members, so long as said free-wheeling means is in the inactive position.

11. In combination, a driving member having a longitudinally movable sleeve thereon, a nut threaded on said sleeve for rotary and longitudinal movement thereon, yielding means tending to move said sleeve in one direction along the driving member, an adjustable abutment for opposing the tendency of the yielding means, a driven member, and a friction clutch having cooperating portions drivably connected to said nut and driven member respectively.

12. In a motor vehicle transmission system, combined clutch and free-wheeling mechanism comprising driving and driven members, a plurality of friction discs drivably connected intermediate said members, free-wheeling means comprising a manually operable member shiftable to render said friction discs ineffective when said driven member overruns the driving member, and resilient means operative to maintain said friction discs under a constant predetermined engaging pressure regardless of either the absolute or relative speeds of said driving and driven members, so long as said free wheeling means is in the inactive position, said free-wheeling member constituting the sole manually controllable part of said mechanism.

13. In a motor vehicle transmission system, combined clutch and free-wheeling mechanism comprising driving and driven members, a friction clutch operatively positioned intermediate said members, means actuated automatically by relative rotation of the driving and driven members to cause the clutch to drive forwardly or free-wheel, manually operated means for eliminating the free-wheeling action of the clutch, and means operative upon the elimination of such free-wheeling action to maintain the clutch in engagement at a constant predetermined pressure regardless of either the absolute or relative speeds of said driving and driven members.

14. In combination, a driving member, a driven member, said driving member being adapted for longitudinal movement relative to said driven member, means tending to hold said driving member in a predetermined position longitudinally of the driven member, an abutment for resisting the action of said holding means, a plurality of inter-leaving friction discs operatively connected to said driving and driven members, and torque responsive means effective to move said driving member out of engagement with said abutment whereby the thrust of said holding means is transferred from said abutment to said friction discs to hold the latter in driving frictional engagement.

15. In combination, a driving member, a driven member, said driving member being adapted for longitudinal movement relative to said driven member, means disposed coaxially of the driving member tending to hold said driving member in a predetermined position longitudinally of the driven member, an abutment for resisting the action of said holding means, a friction clutch operatively connected to said driving and driven members, and torque responsive means effective to move said driving member out of engagement with said abutment whereby the thrust of said holding means is transferred from said abutment to said friction clutch to hold the latter in driving frictional engagement.

16. In combination, a driving member, a driven member, said driving member being adapted for longitudinal movement relative to said driven member, unitary resilient means tending to hold said driving member in a predetermined position longitudinally of the driven member, an abutment for resisting the action of said holding means, a friction clutch operatively connected to said driving and driven members, and torque responsive means effective to move said driving member out of engagement with said abutment whereby the thrust of said resilient means is transferred from said abutment to said friction clutch to hold the latter in driving frictional engagement.

RAYMOND P. LANSING.